Patented Oct. 10, 1950

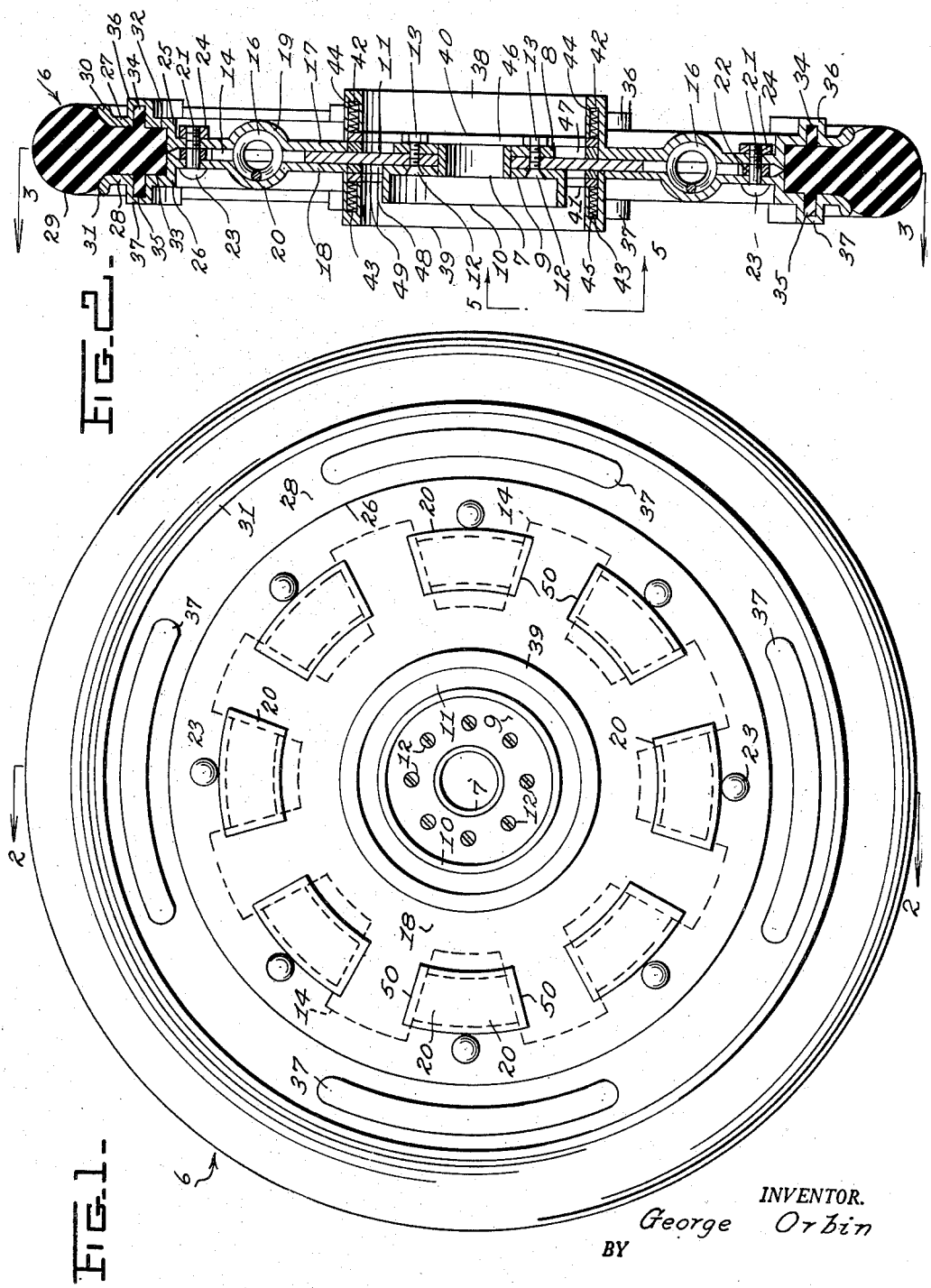

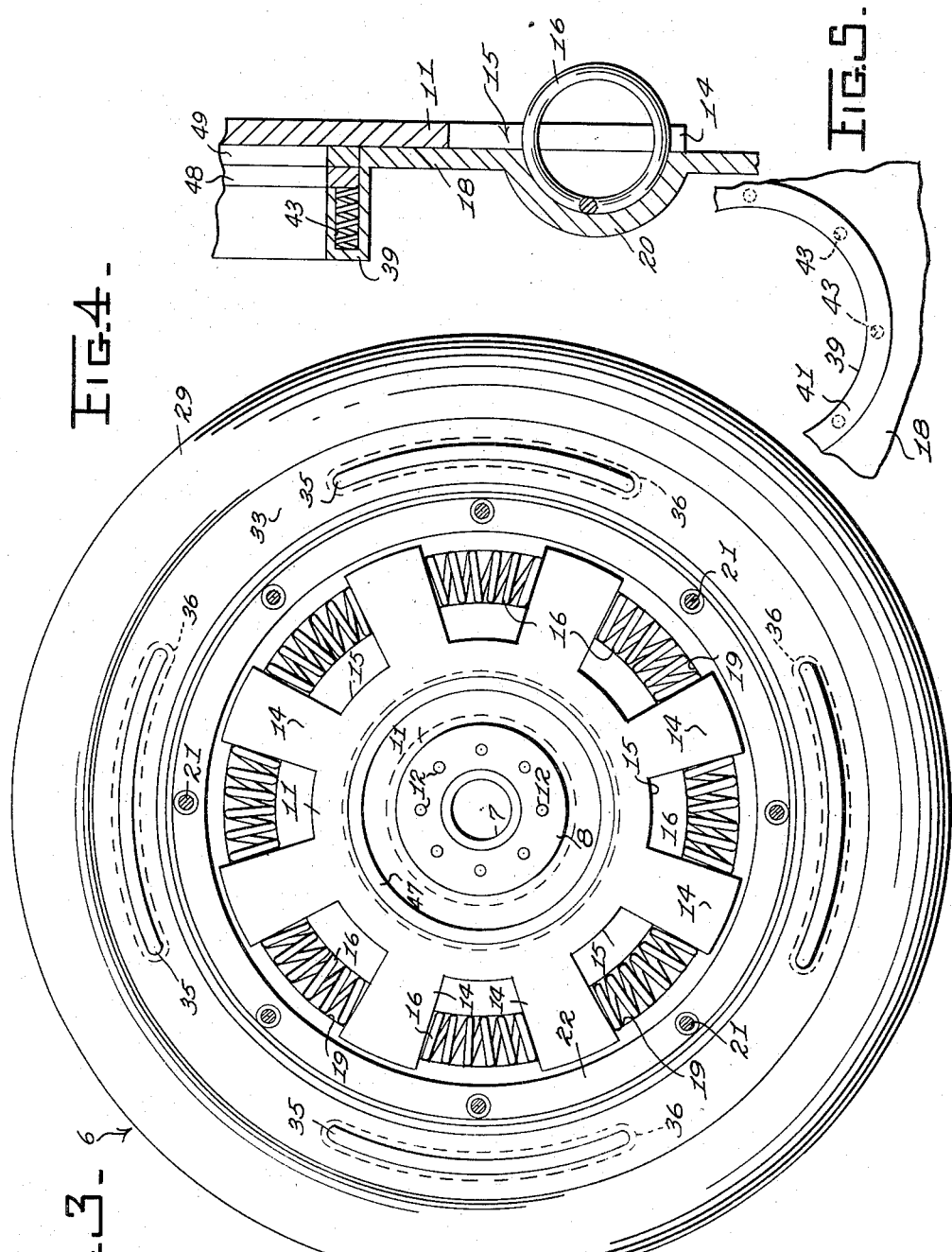

2,524,824

UNITED STATES PATENT OFFICE 2,524,824

SPRING DISK WHEEL

George Orbin, McKees Rocks, Pa.

Application March 18, 1949, Serial No. 82,150

5 Claims. (Cl. 152—92)

This invention relates to vehicle wheels of the disc type, and particularly a spring disc wheel for automobiles, buses and trucks.

The main object of my invention is to provide a resilient disc wheel which does not require a pneumatic tire, but even when provided with a solid rubber tire is more resilient than a conventional disc wheel provided with a pneumatic tire.

Another object is to provide a resilient disc wheel of the character indicated in which a plurality of springs are arranged in a special manner to serve the dual purpose of providing adequate resilience to the wheel and maintaining the wheel as a whole constantly centered with respect to the hub thereof.

A further object is to have such a resilient wheel which is structurally generally flat and the wheel firm and well supported against wobbling and end thrust.

It is also an object to have such a resilient disc wheel of simple and rugged construction and which is so well designed as to be unlikely to break down or get out of order, and hence safe to use at all times.

A practical object is, of course, to provide such a resilient wheel which is reasonable in cost and durable withal.

Other objects and advantages of the invention will appear in further detail as the specification proceeds.

In order to facilitate ready comprehension of this invention for a proper appreciation of the salient features thereof, the invention is illustrated on the accompanying drawings forming part hereof, and in which:

Figure 1 is a side elevation of a spring disc wheel made according to the invention and embodying the same in a practical form;

Figure 2 is a vertical section taken on line 2—2 in Figure 1;

Figure 3 is a section taken on line 3—3 in Figure 2;

Figure 4 is an enlarged fragmentary section of detail;

Figure 5 is a fragmentary detail view taken on line 5—5 in Figure 2.

In the views the same reference numerals indicate the same or like parts.

In the automotive field it is well known that pneumatic tires are relied upon to provide resilience to self-propelled vehicles in addition to the resilience provided by the springs intermediate the vehicle chassis and the axles of the vehicle involved, despite the fact that pneumatic tires have certain drawbacks which are unavoidable. I am, of course, aware that many attempts have been made to produce resilient wheels and various modifications of rubber tires have also been proposed. The main desideratum in a resilient wheel is, of course, to be in a position to use solid rubber tires thereon, but up to this time no generally accepted form of resilient wheel has appeared, and hence this desirable feature still remains a problem.

Upon considering this problem, it has occurred to me that a disc wheel could well be constructed in such fashion as to embody springs and appropriately-supported members in a special arrangement to form a resilient disc wheel, so that pneumatic tires would be superfluous. As a result, I have succeeded in producing a special resilient disc wheel, as will now be more fully described.

Hence, in the practice of my invention, and referring again to the drawings, a vehicle wheel, generally indicated at 6, primarily includes a hollow cylindrical hub 7 provided at one end with a substantially flat peripheral flange 8, while upon the opposite end is mounted the disc portion 9 of a brake drum 10. Between flange 8 and disc 9 of brake drum 10 is secured a star-shaped or toothed disc 11 by means of a plurality of bolts 12 with the heads thereof countersunk in disc 9 of the brake drum, while at the other ends the bolts are provided with nuts 13, thus securing the disc 11 rigidly to flange 8 of hub 7, and likewise securing the brake drum firmly in association with the disc and with the mentioned flange. Disc 11 is substantially flat and provided with an equidistantly-spaced series of radially-extending lugs 14, 14 with slots 15 therebetween generally wider than the lugs spaced apart thereby. In each of slots 15 and with the ends thereof engaged against the adjacent lugs 14 upon each side of the slot is a helical spring 16 curved in such fashion as to have the axis thereof coinciding with an arc centered about hub 7. In order to maintain springs 16 in effective positions between lugs 14 and to guide the same slidably in movement, a pair of wheel discs 18, 19 are slidably disposed on both sides of disc 11, each being provided as indicated at 19 and 20 with arcuate recesses which are externally convex upon the discs and interiorly are concave with each recess 19 registering with the corresponding opposite recess 20 to house one spring 16 therebetween, as in a chamber.

Beyond the recesses, that is, exteriorly thereof, are individual transverse bolts 21 extending through both wheel discs 17 and 18 and a spacing ring or washer 22 between both discs with heads 23 of bolts 21 disposed exteriorly upon one disc and corresponding nuts 24 disposed upon the threaded ends of the bolts upon the other disc 17, thus securing the discs together in properly spaced-apart relation to allow sliding movement of disc 11 therebetween. Immediately beyond and externally of the securing bolts 21, discs 17 and 18 are provided with outwardly-opposite, annular, cylindrical flanges 25, 26 which terminate in a pair of peripheral flanges 27, 28 which are spaced apart in substantial parallelism to form with the inner flanges 25 and 26 an annular receptacle for receiving a tire 29 which is substantially solid and made of natural or artificial rubber or resilient plastic, the peripheral edges of flanges 27 and 28 being outwardly flared at 30 and 31 to support thhe tire and partly cushion the same in actual use. The mentioned tire 29 is preferably molded and at spaced intermediate portions of the sides 32, 33 thereof is provided with outwardly and oppositively-extending arcuate ribs 34, 35 extending into and seated within integral, outwardly-expanded opposite channel portions 36, 37 in discs 17, 18. Projections 34, 35 fitting in arcuate channel recesses 36, 37 serve to retain tire 29 in fixed position between flanges 27 and 28 and prevent rotation of the tire with respect to the discs 17 and 18, while allowing ready removal of the tire and replacement thereof when bolts 21 are loosened and one of the discs removed from the wheel whenever required.

In order to prevent ingress of dust, dirt and grit between discs 17 and 18 and the portion of central disc 11 and lugs thereof engaging with the inner sides of the mentioned wheel discs, the inner peripheries of both discs 17 and 18 are provided with a pair of opposite corresponding cylindrical flanges 38, 39 of sufficient internal diameter to clear the brake drum 10 with room to spare. At the inner end of cylindrical flange 38 is a recessed shoulder 40 and similarly at the inner end of flange 39 is a corresponding recessed shoulder 41, there being a series of spring pockets opening inwardly toward the shoulder 40 in flange 38, as indicated at 42, 42, and in similar manner a series of spring pockets 43, 43 open inwardly to shoulder 41 in flange 39, the pockets 42 containing springs 44 while the pockets 43 contain springs 45. In recess 40 is located a metal pressure ring or washer 46 engaging against a fiber, leather or plastic washer 47 biased by springs 44 and washer 46 against one side of disc 11, virtually locking dust from between the disc and wheel disc 17. In similar fashion, a pressure ring or washer 48 bears against fiber, leather or plastic washer 49 under bias of springs 45 and makes sliding frictional contact with the other side of central disc 11 and thereby virtually locks out dust and dirt from between the mentioned disc and wheel disc 18. The arrangement is such that when the wheel is mounted on a vehicle and the weight of the latter is exerted in the hollow hub 7, disc 11 is depressed between wheel discs 17 and 18 as far as allowed by springs 16 in slots 15 between the disc lugs 14, the two springs 16 which are disposed at the extreme right and left, as particularly shown in Figure 4, with their axes substantially vertical, taking the direct compression as exerted between the ends 58, 58 of arcuate recessed portions 20, 20 and the sides of lugs 14, 14 and the corresponding ends of arcuate recesses 19 on the other side of disc 17, while the other springs partake in decreasing manner above and below the horizontal level occupied by the mentioned extreme right and left springs. While metal is preferred for the discs and various parts of the wheels according to the invention, except for the friction washers 47 and 49 and the tire 29, other materials may, of course, be used if desired so long as they are sufficiently rigid to retain the proper form in service.

Manifestly, variations may be resorted to and parts and features may be modified or used without others within the scope of the appended claims.

Having now fully described my invention, I claim:

1. A spring disc wheel for a vehicle including a pair of wheel discs having central hub clearance openings therein, a hub located in the openings in the discs, means securing the wheel discs in spaced-apart relation, an intermediate disc fixed upon said hub and slidably extending radially between the wheel discs, a plurality of integral lugs projecting radially from the intermediate disc between said wheel discs and equidistantly spaced apart, a plurality of oppositely-outwardly-bulging registering pairs of spring chambers in the latter bridging the spaces between the radial lugs in the intermediate disc and elongated with the axes thereof disposed in the plane of said intermediate disc and generally perpendicular to the axis of the hub openings, a plurality of helical compression springs individually mounted between each pair of registering spring chambers in the space between each adjacent pair of said radial lugs on said intermediate disc, and means on said wheel discs for receiving a tire therebetween in a position to extend peripherally therefrom.

2. A spring disc wheel for a vehicle including a pair of wheel discs having central hub clearance openings therein, a hub located in the openings in the discs, means securing the wheel discs in spaced-apart relation, an intermediate disc fixed upon said hub and slidably extending radially between the wheel discs, a plurality of integral lugs projecting radially from the intermediate disc between said wheel discs and equidistantly spaced apart, a plurality of oppositely-outwardly-bulging arcuate registering pairs of spring chambers in the latter bridging the spaces between the radial lugs on the intermediate disc and arched equidistantly about the axes of the hub openings in the plane of said intermediate disc, a plurality of helical compression springs individually mounted between each pair of registering arcuate spring chambers in the space between each adjacent pair of said radial lugs on said intermediate disc, and means on the peripheries of said wheel discs for receiving a tire therebetween in a position to extend peripherally therefrom.

3. A spring disc wheel for a vehicle including a pair of wheel discs having central hub clearance openings therein, a hub located in the openings in the discs, means securing the wheel discs in spaced-apart relation, an intermediate disc fixed upon said hub and slidably extending radially between the wheel discs, a plurality of integral lugs projecting radially from the intermediate disc between said wheel discs and equidistantly spaced apart, a plurality of oppositely-outwardly-bulging arcuate registering pairs of spring chambers in the latter bridging the spaces between the radial lugs on the intermediate disc and arched equidistantly about the axes of the hub openings in the plane of said intermediate disc, a plurality of helical compression springs individually mounted between each pair of registering arcuate spring chambers in the space between each adjacent pair of said radial lugs on said intermediate disc, a pair of oppositely-outwardly-extending cylindrical flanges on the peripheries of said wheel discs, a pair of substantially parallel peripheral flanges on the outer ends of said cylindrical flanges spaced apart and having a plurality of oppositely-outwardly-projecting recess portions therein, a resilient tire disposed between the parallel peripheral flanges and extending radially outwardly beyond the latter and widening exteriorly thereof, and a plurality of projecting ribs on the opposite sides of the tire between said parallel flanges extending into the recess portions therein to retain said tire in position on the wheel and prevent rotation thereof relative to the latter.

4. A spring disc wheel for a vehicle including a pair of wheel discs having central hub clearance openings therein, a hub located in the openings in the discs, means securing the wheel discs in spaced-apart relation, an intermediate disc fixed upon said hub and slidably extending radially between the wheel discs, a plurality of integral lugs projecting radially from the intermediate disc between said wheel discs and equidistantly spaced apart, a plurality of oppositely-outwardly-bulging arcuate registering pairs of spring chambers in the latter bridging the spaces between the radial lugs on the intermediate disc and arched equidistantly about the axes of the hub openings in the plane of said intermediate disc, a plurality of helical compression springs individually mounted between each pair of registering arcuate spring chambers in the space between each adjacent pair of said radial lugs on said intermediate disc, a pair of correspondingly-opposite cylindrical flanges projecting axially upon the inner peripheries of said wheel discs about the hub openings therein and having annular recess portions facing said intermediate disc, contact and pressure rings disposed in said recess portions with the contact rings bearing directly against the opposite side of said intermediate disc, the cylindrical flanges having series of spring sockets opening toward said intermediate disc, a plurality of springs in said sockets engaging said pressure rings and biasing the contact rings against said intermediate disc, and means on said wheel discs for receiving a tire therebetween in a position to extend peripherally therefrom.

5. A spring disc wheel for a vehicle including a pair of wheel discs having central hub clearance openings therein, a hub located in the openings in the discs, means securing the wheel discs in spaced-apart relation, an intermediate disc fixed upon said hub and slidably extending radially between the wheel discs, a plurality of integral lugs projecting radially from the intermediate disc between said wheel discs and equidistantly spaced apart, a plurality of oppositely-outwardly-bulging arcuate registering pairs of spring chambers in the latter bridging the spaces between the radial lugs upon the intermediate disc and arched equidistantly about the axes of the hub openings in the plane of said intermediate disc, a plurality of helical compression springs individually mounted between each pair of registering arcuate spring chambers in the space between each adjacent pair of said radial lugs on said intermediate disc, a pair of correspondingly-opposite cylindrical flanges projecting axially upon the inner peripheries of said wheel discs about the hub openings therein and having annular recess portions facing said intermediate disc, contact and pressure rings disposed in said recess portions with the contact rings bearing directly against the opposite side of said intermediate disc, the cylindrical flanges having series of spring sockets opening toward said intermediate disc, a plurality of springs in said sockets engaging said pressure rings and biasing the contact rings against said intermediate disc, a pair of oppositely - outwardly - extending cylindrical flanges on the peripheries of said wheel discs, a pair of substantially parallel peripheral flanges on the outer ends of said cylindrical flanges spaced apart and having a plurality of oppositely-outwardly-projecting recess portions therein, a resilient tire disposed between the parallel peripheral flanges and extending radially outwardly beyond the latter and widening exteriorly thereof, and a plurality of projecting ribs on the opposite sides of the tire between said parallel flanges extending into the recess portions therein to retain said tire in position on the wheel and prevent rotation thereof relative to the latter.

GEORGE ORBIN.

No references cited.